United States Patent [19]
Reddy

[11] Patent Number: 6,164,913
[45] Date of Patent: Dec. 26, 2000

[54] DUST RESISTANT AIRFOIL COOLING

[75] Inventor: Bhanu M. Reddy, Boxford, Mass.

[73] Assignee: General Electric Company, Cincinnati, Ohio

[21] Appl. No.: 09/360,923

[22] Filed: Jul. 26, 1999

[51] Int. Cl.[7] ........................................... F01D 5/08
[52] U.S. Cl. ............................................ 416/97 R; 415/115
[58] Field of Search ..................................... 416/90 R, 92, 416/97 R, 97 A, 96 R; 415/115

[56] References Cited

U.S. PATENT DOCUMENTS

| | | | |
|---|---|---|---|
| 4,820,122 | 4/1989 | Hall et al. | 416/97 R |
| 5,176,499 | 1/1993 | Damlis et al. | 416/97 R |
| 5,378,108 | 1/1995 | Zelesky | 416/97 R |
| 5,503,529 | 4/1996 | Anselmi et al. | 416/97 R |

OTHER PUBLICATIONS

GE Aircraft Engines, CF34–3B turbine blade drawing excerpt, in commercial production and use in this country for more than one year.

*Primary Examiner*—Edward K. Look
*Assistant Examiner*—Richard Woo
*Attorney, Agent, or Firm*—Andrew C. Hess; Rodney M. Young

[57] ABSTRACT

A turbine airfoil includes first and second sidewalls joined together at leading and trailing edges, and extending longitudinally from root to tip. An internal cooling circuit is disposed between the sidewalls for channeling a coolant therein. A column of longitudinally spaced apart ejection slots extend through the first sidewall along the trailing edge, and are disposed in flow communication with the cooling circuit for discharging the coolant toward the trailing edge. Some of the slots are disposed between a pitchline and the tip and are inclined at different ejection angles longitudinally outwardly from the pitchline. And, some of the slots are disposed between the pitchline and root and extend at least parallel with the pitchline without longitudinally inward inclination.

11 Claims, 2 Drawing Sheets

DUST RESISTANT AIRFOIL COOLING

BACKGROUND OF THE INVENTION

The present invention relates generally to gas turbine engines, and, more specifically, to turbine blade cooling.

In a gas turbine engine, air is pressurized in a compressor and mixed with fuel and ignited in a combustor for generating hot combustion gases. The gases flow downstream through turbine stages which extract energy therefrom for powering the compressor and producing useful work, such as powering a fan for propelling an aircraft in flight.

Turbine stator vanes and rotor blades include corresponding hollow airfoils through which air bled from the compressor is circulated as a coolant therefor. The airfoils may include one or more cooling circuits therein extending radially or longitudinally for channeling the coolant. Various features may be incorporated for increasing heat transfer for more efficiently cooling the airfoils.

Each airfoil has a generally concave pressure sidewall and an opposite generally convex suction sidewall joined together at axially opposite leading and trailing edges. The combustion gases flow downstream over the two sidewalls with different amounts of heat input or load therein. Accordingly, the internal cooling circuits are specifically configured to match the different cooling demands of the airfoil for improving efficiency of operation.

The coolant is discharged from the airfoil through various apertures, such as film cooling holes disposed in longitudinal rows or columns along the pressure and suction sidewalls, and a column of trailing edge apertures or slots. These various apertures are small in size and configured for locally cooling the airfoil in their vicinities.

The coolant is discharged from the apertures with a minimum backflow margin to prevent ingestion of combustion gases therein, and a corresponding blowing ratio is limited at each aperture to prevent undesirable discharge jets therefrom.

The discharge of the coolant through the apertures affects the cooling ability thereof as well as affects overall efficiency of the engine since the coolant mixes with the combustion gases flowing over the airfoil for subsequent discharge from the engine. Differences in direction and velocity of the discharge coolant and the combustion gases cause undesirable mixing losses which should be minimized.

Furthermore, the coolant bled from the compressor may include fine particles of dust which travel through the airfoil with the coolant and discharged therewith through the apertures. Since the apertures are small, it is undesirable to accumulate dust therein which would further reduce their size or interrupt coolant flow therethrough which would adversely affect the desired cooling.

Accordingly, it is desired to provide a turbine airfoil having improved cooling resistant to dust accumulation in the discharge apertures thereof.

BRIEF SUMMARY OF THE INVENTION

A turbine airfoil includes first and second sidewalls joined together at leading and trailing edges, and extending longitudinally from root to tip. An internal cooling circuit is disposed between the sidewalls for channeling a coolant therein. A column of longitudinally spaced apart ejection slots extend through the first sidewall along the trailing edge, and are disposed in flow communication with the cooling circuit for discharging the coolant toward the trailing edge. Some of the slots are disposed between a pitchline and the tip and are inclined at different ejection angles longitudinally outwardly from the pitchline. And, some of the slots are disposed between the pitchline and root and extend at least parallel with the pitchline without longitudinally inward inclination.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
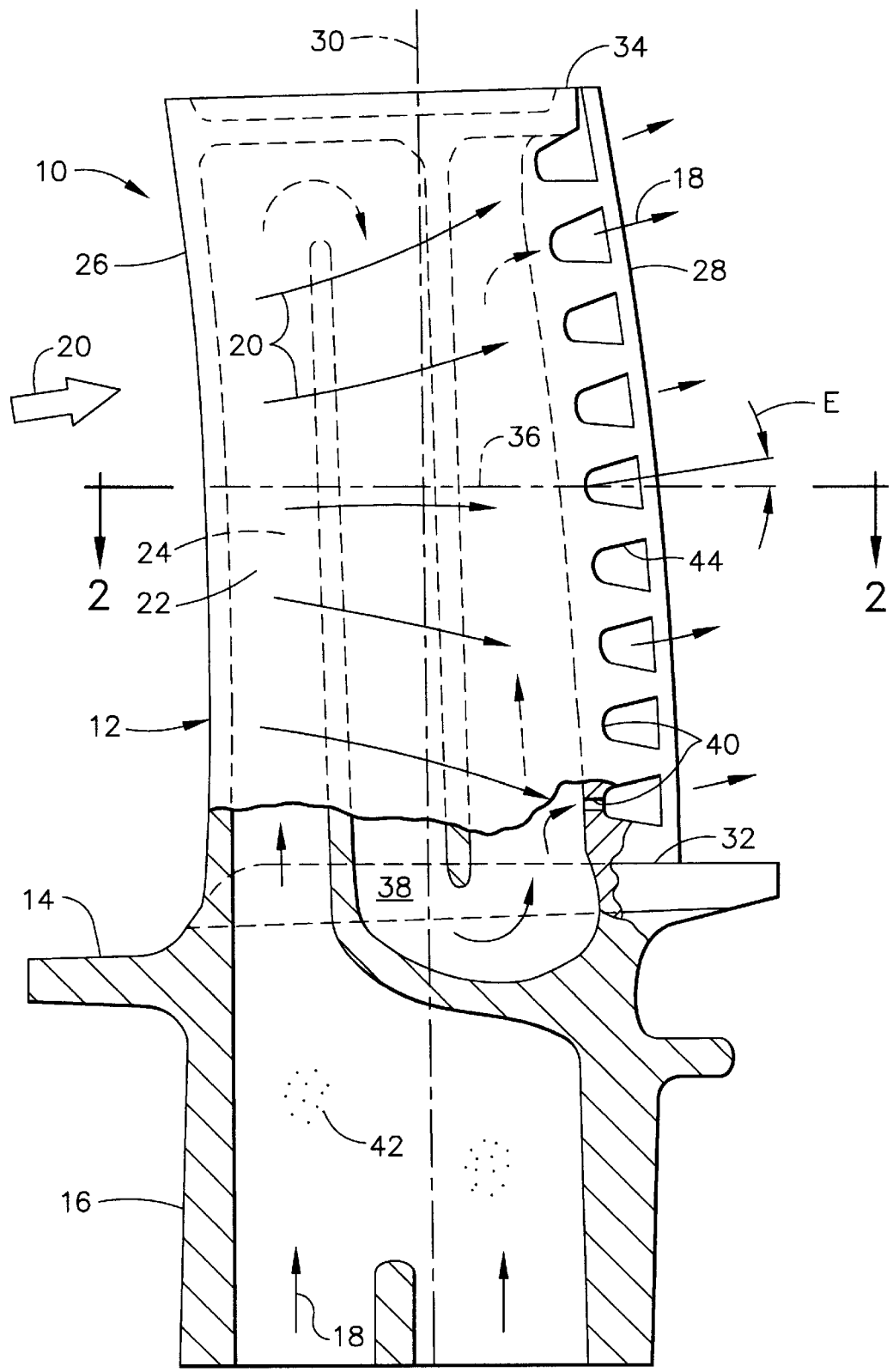
FIG. 1 is a partly sectional elevational view of an exemplary gas turbine engine turbine rotor blade having airfoil election slots in accordance with an exemplary embodiment of the present invention.

Illustrated in FIG. 1 is an exemplary turbine rotor blade 10 for a gas turbine engine. The blade includes an airfoil 12 integrally joined to a platform 14 and a dovetail 16 in a unitary casting of conventional configuration. The dovetail 16 retains the blade in a complementary dovetail slot formed in the perimeter of a rotor disk.

During operation, air 18 is initially pressurized in a compressor (not shown) and mixed with fuel and ignited in a combustor (not shown) for generating hot combustion gases 20 which flow downstream into turbine stages including a row of the-blades 10. The airfoil is hollow and receives a portion of the compressed air 18 as a coolant for cooling the blade during operation. The coolant 18 is suitably channeled to the underside of the dovetail for flow radially outwardly therethrough.

Figure 2:
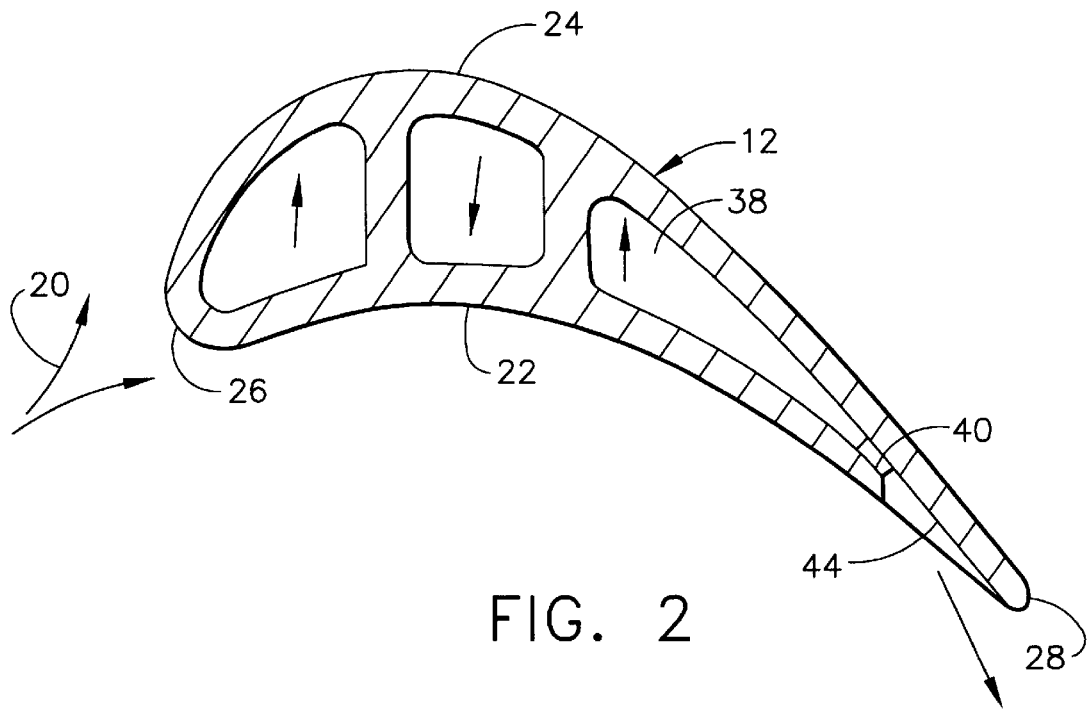
FIG. 2 is a radial sectional view through the airfoil illustrated in FIG. 1 and taken along line 2—2.

As shown in FIGS. 1 and 2, the airfoil 12 includes a first or pressure sidewall 22 which is generally concave, and a laterally or circumferentially opposite second or suction sidewall 24 which is generally convex, which are joined together at axially or chordally opposite leading and trailing edges 26,28.

The blade has a longitudinal or radial axis 30, with the airfoil extending longitudinally therealong from a root 32 to a tip 34. The platform 14 defines a portion of the radially inner flowpath for the combustion gases 20 which flow over the airfoil during operation, with the airfoil tip 34 being disposed closely adjacent to a stationary turbine shroud (not shown) surrounding the row of blades.

The airfoil illustrated in FIG. 1 includes a pitchline 36 which is defined as the mid-span radial section of the airfoil from root to tip being perpendicular or normal to the longitudinal axis 30. Exemplary streamlines of the combustion gas 20 are illustrated over the pressure sidewall 22 in FIG. 1 as migrating radially or longitudinally outwardly outboard of the pitchline as they flow generally downstream in the aft direction, and migrating longitudinally inwardly inboard of the pitchline to the root.

As shown in elevation in FIG. 1 and in section in FIG. 2, the two sidewalls 22,24 are laterally spaced apart between the leading and trailing edges with corresponding ribs or bridges therebetween to define an internal cooling channel or circuit 38 for channeling the compressor bleed air 18 as a coolant for cooling the blade during operation.

In accordance with the present invention, a plurality of longitudinally spaced apart ejection holes or slots 40 extend chordally through the pressure sidewall 22 in a preferred embodiment along the trailing edge. The ejection slots may have any suitable configuration such as the constant area oval slots illustrated in more particularity in FIG. 3. The ejection slots are disposed in flow communication with the internal cooling circuit 38 for discharging coolant therefrom toward the trailing edge.

Figure 3:
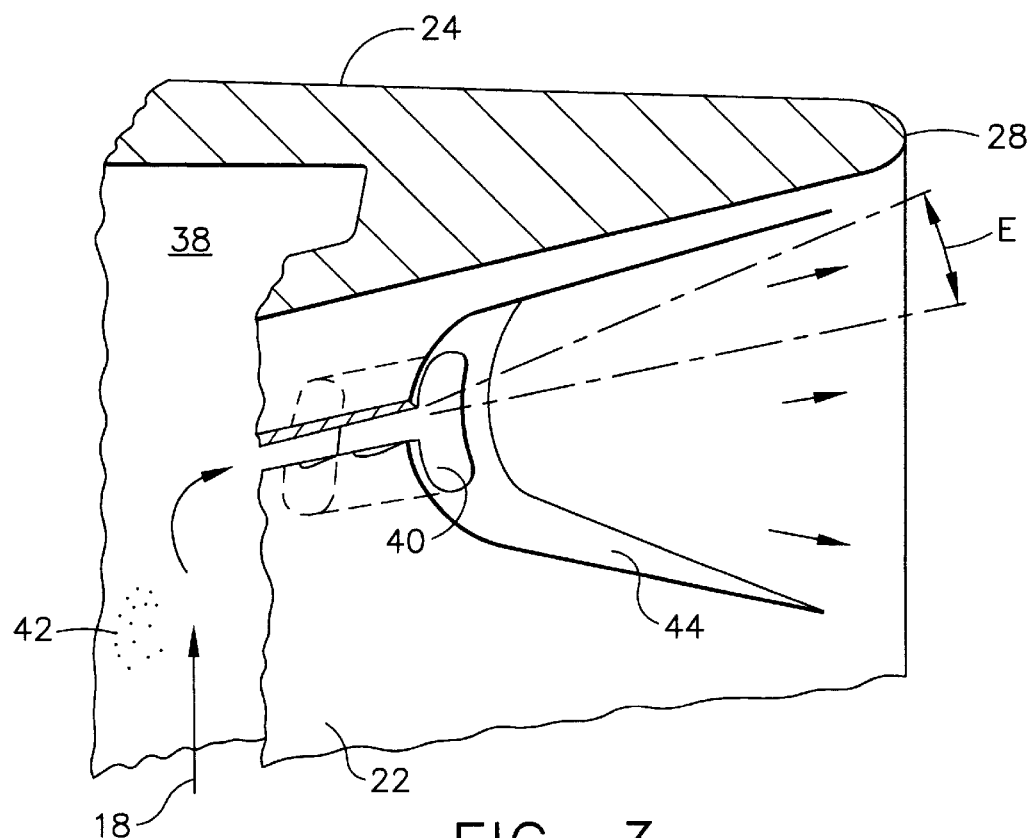
FIG. 3 is an enlarged, partly sectional view of an exemplary one of the ejection slots illustrated in FIG. 1.

Each of the ejection slots 40 as illustrated in FIGS. 1 and 3 is oriented relative to the pitchline 36 or the normal to the longitudinal axis 30 by an ejection angle E which defines the direction of coolant discharge from the ejection slot.

As shown in FIG. 1, the representative combustion gas streamlines migrate radially outwardly and radially inwardly relative to the pitchline 36. Accordingly, some of the ejection slots 40 are disposed between the pitchline 36 and the airfoil tip 34 in the outboard portion of the airfoil, and are inclined at respectively different ejection angles longitudinally outwardly from the pitchline 36 in a positive sense. In the preferred embodiment, the ejection angles for the outboard slots 40 are acute to generally match the migration angles or inclination of the combustion gas streamlines along the pressure sidewall for reducing mixing losses as the discharge coolant 18 encounters the combustion gases flowing outside the airfoil.

However, the combustion gas streamlines between the pitchline 36 and the airfoil root 32 in the inboard portion of the airfoil migrate radially inwardly. Although the inboard ejection slots 40 could be inclined to match those streamlines for reducing mixing losses, this is undesirable in view of dust 42 which may be entrained in the cooling air channeled through the cooling circuits.

More specifically, the ejection slots 40 illustrated in more particularity FIG. 3 are relatively small holes through which the coolant 18 is discharged along the trailing edge. If the inboard ejection slots 40 were inclined longitudinally inwardly with correspondingly negative sense ejection angles E, the entrained dust 42 may undesirably accumulate in the slots 40 reducing their effectiveness.

Accordingly, whereas the outboard ejection slots illustrated in FIG. 1 have positive ejection angles, the inboard ejection slots disposed between the pitchline and root preferably extend at least parallel, i.e. at least zero degrees, with the pitchline, and without longitudinally inward inclination or negative ejection angles. For example, the inboard slot ejection angles are preferably not less than zero degrees to prevent their inclination radially inwardly. In this way, any dust entrained in the coolant can follow the predominant path thereof through the cooling circuit and ejection slots, and with centrifugal force generated during rotor operation of the blade will be driven through the ejection slots with little or no accumulation therein.

As shown in FIG. 1, the ejection slots 40 preferably decrease in ejection angle or magnitude of inclination from the tip 34 to the pitchline 36 to generally match the correspondingly decreasing inclination of the migrating combustion gas streamlines. Correspondingly, the ejection angles for the slots between the pitchline and root preferably have smaller magnitudes than the ejection angles outboard of the pitchline. In this way, mixing losses for the inboard ejection slots may be reduced, while maintaining dust resistant cooling capability thereof with reduced dust accumulation.

In a preferred embodiment, the ejection slots 40 decrease in magnitude of ejection angle in turn from the tip 34 to the pitchline 36 and then to the root 32. The ejection angle decrease is preferably uniform from slot-to-slot in turn for reducing mixing losses while providing dust accumulation resistance, and for improving the ability to cast or otherwise manufacture the ejection slots at the airfoil trailing edge.

Also in the preferred embodiment, the root ejection slot 40 directly adjacent the root 32 has a minimum ejection angle, with the tip ejection slot adjacent the tip 34 having a maximum ejection angle. The minimum ejection angle is preferably acute and positive to incline the innermost ejection slot 40 longitudinally outwardly from the root to ensure dust resistance without significant mixing losses.

In the specific embodiment illustrated in FIG. 1, the maximum ejection angle at the outermost ejection slot at the airfoil tip is about 10°, and the minimum ejection angle for the innermost ejection slot at the root is about 2°. And, the ejection angles decrease by about 1° from slot-to-slot between the tip and root, with there being nine corresponding ejection slots in total.

Also in the preferred embodiment illustrated in FIG. 1, the cooling circuit 38 is serpentine and includes a last pass or leg extending longitudinally outwardly adjacent the trailing edge 28 to directly feed the coolant 18 to the column of ejection slots 40 in parallel. The serpentine circuit 38 includes additional first and second passes or legs disposed forwardly from the last or third leg. The first leg preferably extends directly behind the airfoil leading edge 26, with a reverse bend at the airfoil tip for turning the flow radially inwardly through the second leg extending radially inwardly along the mid-chord. A reverse bend at the platform then turns the coolant radially outwardly into the third and final serpentine leg.

Since the dust 42 has mass it is subject to centrifugal force not only as it turns between the several bends in the serpentine circuit but also due to centrifugal force as the blade rotates during operation. The coolant 18 thusly enters the third serpentine leg near the trailing edge from the airfoil root and flows radially outwardly, with any dust 42 entrained therein being centrifuged. By inclining the ejection slots longitudinally outwardly, centrifugal force may be used to advantage for driving the entrained dust through the ejection slots without stagnation therein for reducing accumulation thereof during operation. By avoiding negative ejection angles for the inboard ejection slots 40, the coolant, and any entrained dust, is prevented from reversing predominant direction as it flows through the ejection slots for reducing dust accumulation therein.

As generally shown in FIG. 1, and in more particularity FIG. 3, each of the ejection slots 40 cooperates with a respective trough 44 arranged in a column immediately adjacent the trailing edge. The column of troughs is disposed in the pressure sidewall 22 along the trailing edge. Each trough has a forward wall of maximum depth through which the outlet end of a corresponding ejection slot 40 is disposed, with the inlet of the ejection slot extending through the airfoil internally to the cooling circuit 38. Each trough 44 has sidewalls which decrease in depth for blending the troughs downstream to the trailing edge 38. The sidewalls of each trough diverge radially for distributing the coolant ejected from the individual ejection slots 40.

The troughs 44 may have any conventional form for cooperating with the respective ejection slots 40. The ejection slots and troughs are preferably disposed in the airfoil pressure sidewall 22 since the heat load from the combustion gases is typically greater along the pressure sidewall than along the suction sidewall.

The ejection slots disclosed above may be used to advantage for better matching the ejection angle of the coolant as it is discharged therefrom to the local inclination of the combustion gas streamlines for reducing mixing losses. The ejection angles preferably vary to not only match the angle of the streamlines, but also reduce dust accumulation in the ejection slots. In view of the specific geometry disclosed above, negative ejection angles are undesirable for dust accumulation. The selective introduction of different ejection angles from tip to root described above reduces mixing losses while improving dust resistance.

The selectively inclined ejection holes may be used in other types of turbine blades with differently configured internal cooling circuits. And, the ejection slots may be used in stationary turbine nozzle vanes to advantage, although such vanes are not subject to centrifugal force due to rotation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine airfoil comprising:

first and second sidewalls joined together at leading and trailing edges and extending longitudinally from a root to tip, with a pitchline therebetween;

said sidewalls being spaced apart between said leading and trailing edges to define an internal cooling circuit therebetween for channeling a coolant;

a column of longitudinally spaced apart ejection slots extending through said first sidewall along said trailing edge, and disposed in flow communication with said cooling circuit for discharging said coolant toward said trailing edge; and some of said slots being disposed between said pitchline and tip, and inclined at different ejection angles longitudinally outwardly from said pitchline, and some of said slots being disposed between said pitchline and root, and extending at least parallel with said pitchline without longitudinally inward inclination.

2. An airfoil according to claim 1 wherein said slots decrease in ejection angle from said tip to said pitchline.

3. An airfoil according to claim 2 wherein said ejection angles between said pitchline and root have smaller magnitudes than said ejection angles outboard of said pitchline.

4. An airfoil according to claim 3 wherein said slots decrease in ejection angle in turn from said tip to said root.

5. An airfoil according to claim 4 wherein said ejection angles decrease uniformly from slot-to-slot in turn.

6. An airfoil according to claim 3 wherein said ejection slot adjacent said root has a minimum ejection angle, and said slot adjacent said tip has a maximum ejection angle.

7. An airfoil according to claim 6 wherein said minimum ejection angle is acute to incline said slot longitudinally outwardly from said root.

8. An airfoil according to claim 7 wherein said maximum ejection angle is 10°, and said minimum ejection angle is 2°, and said ejection angles decrease by 1° from said tip to said root.

9. An airfoil according to claim 3 wherein said cooling circuit is serpentine and has a last pass adjacent said trailing edge to feed said coolant to said ejection slots, and additional passes disposed forwardly therefrom.

10. An airfoil according to claim 9 further comprising a column of diverging troughs disposed in first sidewall along said trailing edge, and respective ones of said ejection slots are disposed in flow communication therewith for discharging said coolant therein.

11. An airfoil according to claim 10 wherein said first sidewall is a generally concave, pressure sidewall, and said second sidewall is a generally convex, suction sidewall.

* * * * *